United States Patent
Fullerton

[15] 3,669,005
[45] June 13, 1972

[54] CREAM FILLER APPARATUS
[72] Inventor: James Fullerton, Leonia, N.J.
[73] Assignee: International Telephone and Telegraph Corporation, Nutley, N.J.
[22] Filed: June 2, 1970
[21] Appl. No.: 42,639

[52] U.S. Cl. .................................................99/450.1, 74/55
[51] Int. Cl. ..........................................A21c 9/00, A23g 1/20
[58] Field of Search ...............107/1 R, 27, 27 A, 27 B, 27 R, 107/1 K, 8 A; 18/26, 30; 100/222; 74/55, 25, 53, 54

[56] References Cited

UNITED STATES PATENTS 3,481,209  12/1969  Lunin ..............................107/27 R X
3,327,651  6/1967  Nielsen ..............................107/8 A
3,465,693  9/1969  Lapata ..............................107/1 R Primary Examiner—Jordan Franklin
Assistant Examiner—Geo. V. Larkin
Attorney—C. Cornell Remsen, Jr., Walter J. Baum, Paul W. Hemminger, Charles L. Johnson, Philip M. Bolton, Isidore Togut, Edward Goldberg and Menotti J. Lombardi, Jr.

[57] ABSTRACT

A cream filler apparatus is provided for handling pans containing cake products which are to be filled with cream from a common hopper by a cream injecting nozzles. The apparatus includes parallel conveying belts which move the pans to two waiting stops which are selectively activated, and the pan, when positioned, is raised by a lifting frame. The lifting frame is pivotally mounted at one end and intermittently moved by a lifter assembly under the control of a driven cam.

10 Claims, 5 Drawing Figures

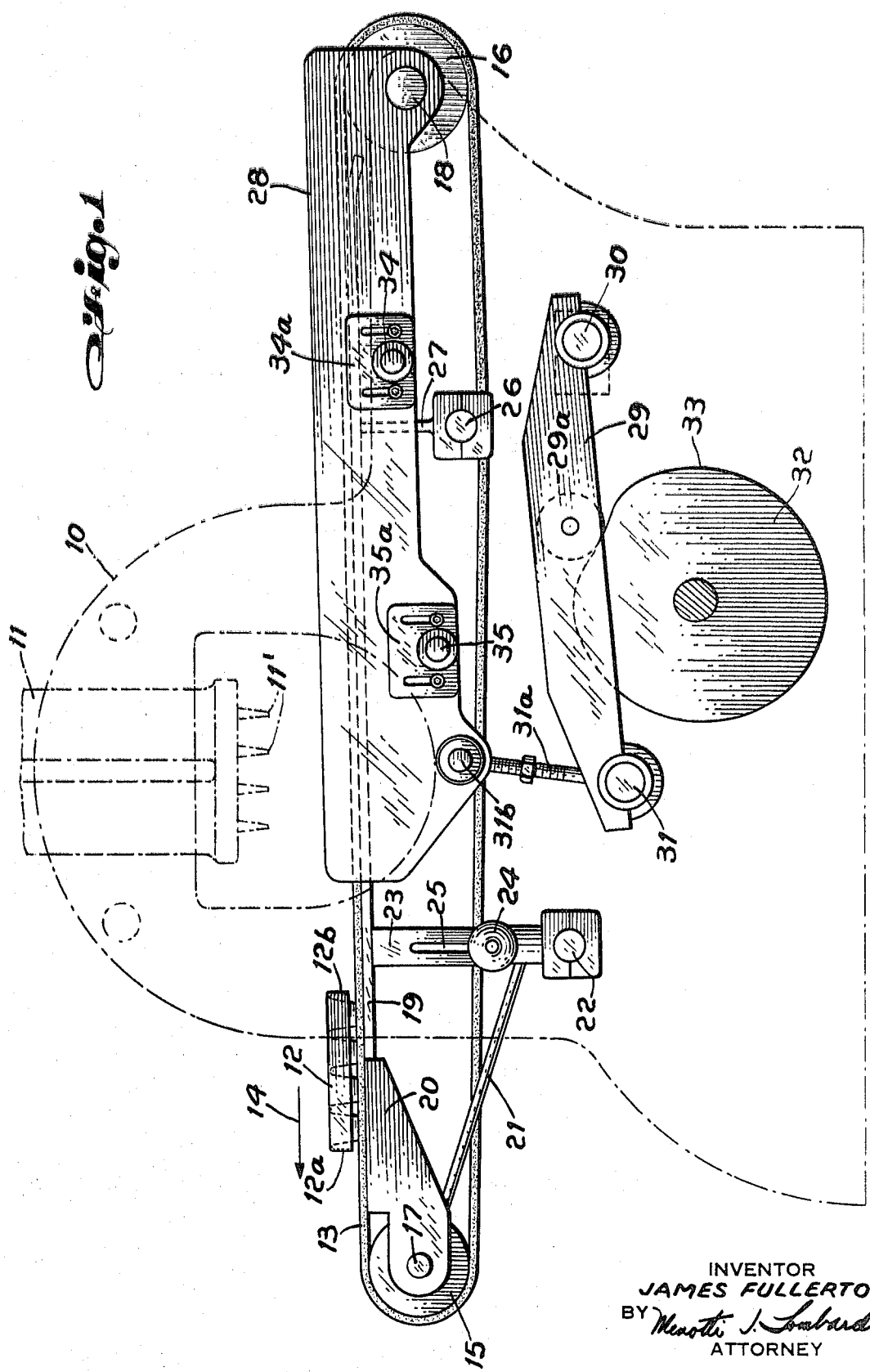

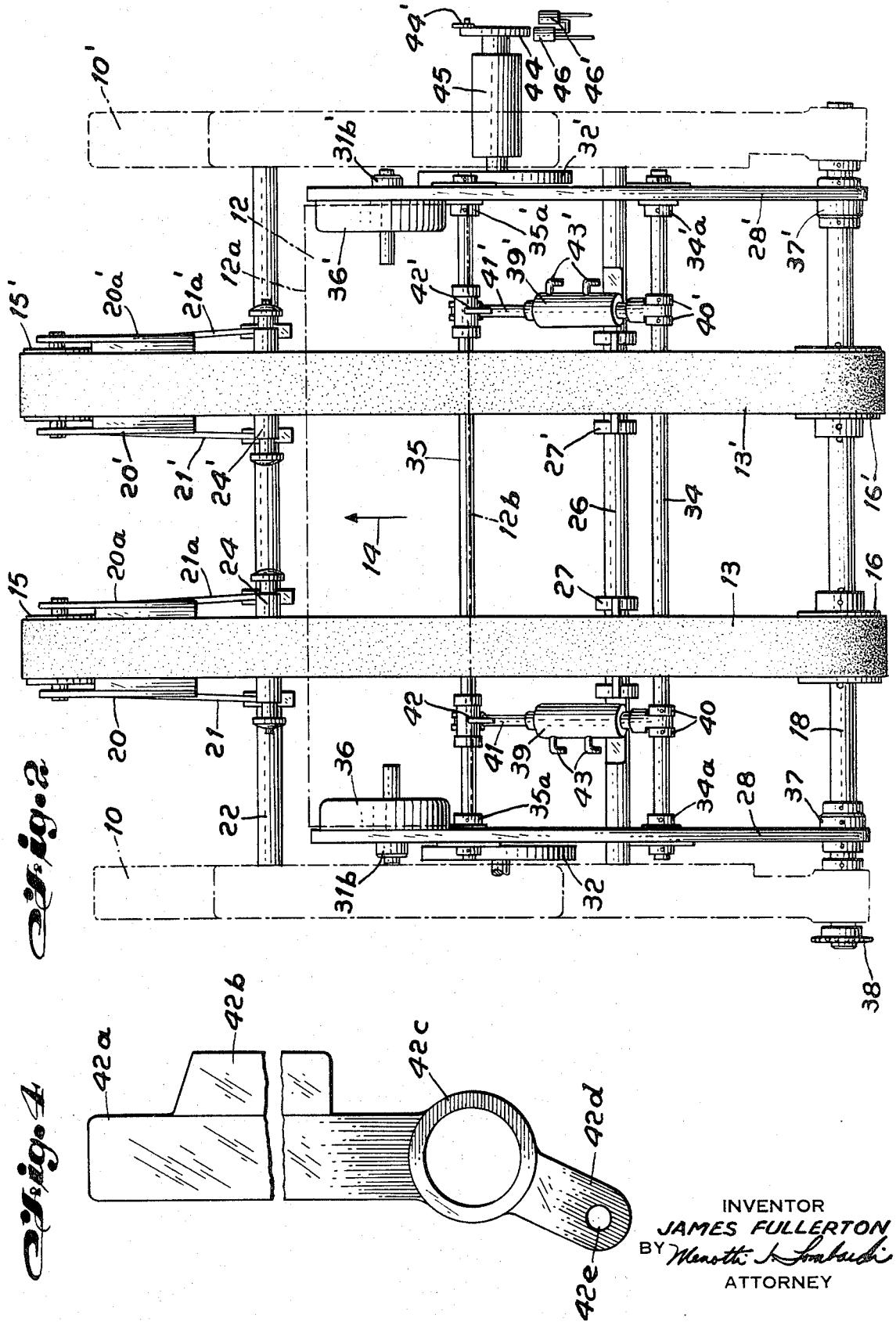

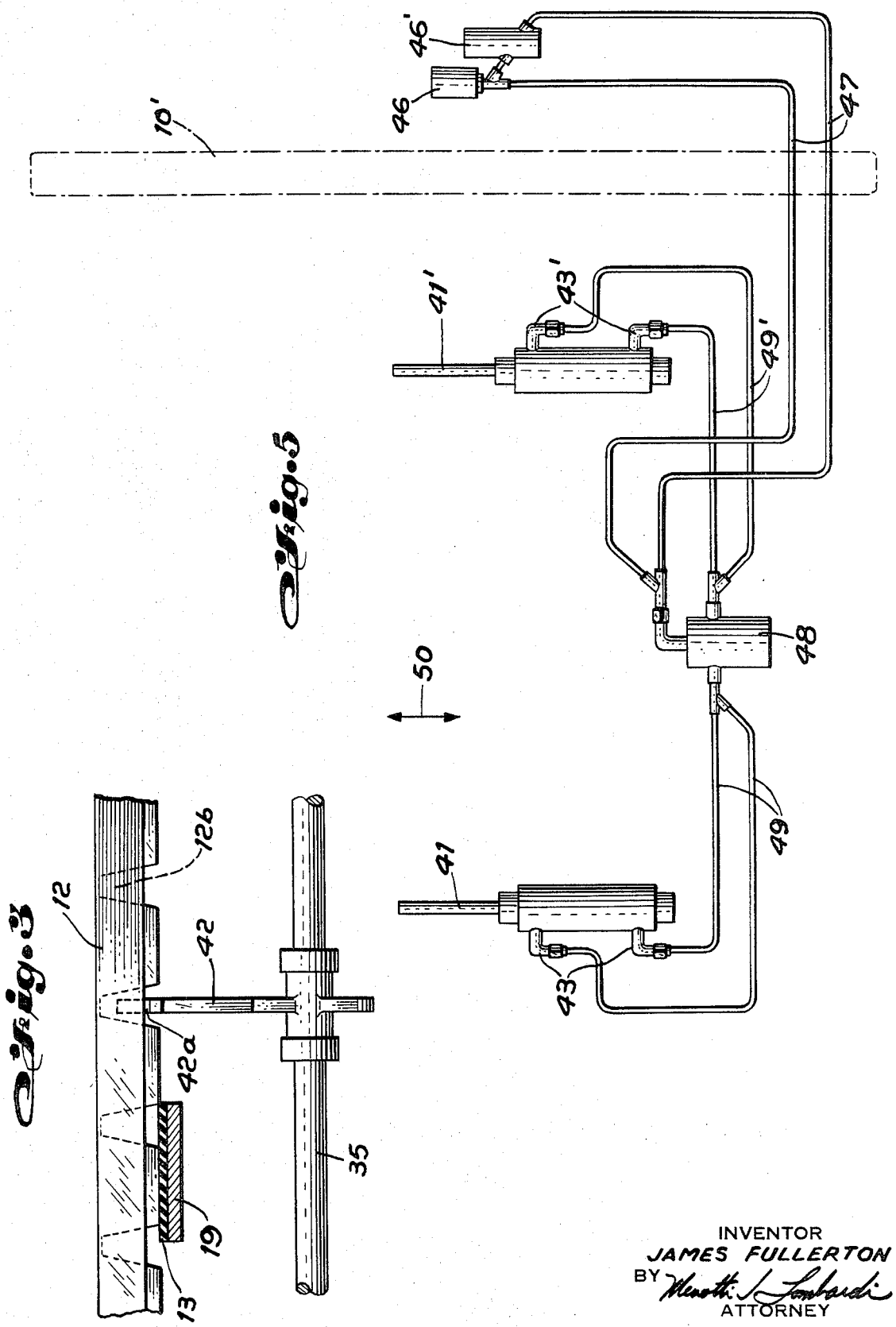

3,669,005

CREAM FILLER APPARATUS

BACKGROUND OF THE INVENTION

In general, this invention relates to apparatus for filling soft-baked goods, and more particularly to apparatus for filling soft-baked goods in which the goods are conveyed and raised at a predetermined location, and the goods after being filled are lowered and continued in the conveying direction.

According to present arrangements, a known depositing machine has a continuous wide feed belt and a pivoted table supporting the belt which is intermittently rocked to cause the raising and lowering of the goods to an injection nozzle. However, these arrangements have considerable drawbacks. A primary problem is that the entire table and belt transporting the goods must be raised to the filling position. This places considerable strain on the lifting mechanisms and causes rapid wear of the operating cams and gears which requires numerous replacements. The resulting production shut down for repair is a serious drawback in automated assembly lines where the machine is in constant use. Another drawback of the prior art arrangements is the fact that the feed belt is part of the conveying line and must also be raised with the table to provide the continuous assembly line movement. The continuous raising and lowering of the feed belt with the table increases its wear and reduces its useful life. Still another drawback of the prior art apparatus is that by virtue of the size of the components to be raised and lowered, the operating speed of the cream type filling machines must be slower to account for the added weight of the parts to be moved.

SUMMARY OF THE INVENTION

Therefore, it is an object of this invention to provide cream filling apparatus in which the moving parts are a minimum and light weight.

Another object of this invention is to provide an arrangement for moving and stopping the baking pans in a predetermined position in the apparatus.

Yet another object of the invention is to provide an arrangement in which the lifting portions of the apparatus are distinct from the portions of the apparatus which provide and form part of the conveying means for the pans.

According to the broader aspects of the invention there is provided two parallel feed belts which move pans to two waiting stops which are selectively activated, and a lifting frame means, pivotally mounted, is raised in response to the rotation of a driven cam.

A feature of the invention is that there is provided a pair of controlled pivotably mounted pan fingers to stop the moving pan and to retain the pan in a predetermined position, whereby the pan may be lifted from the conveying means by the movement of the lifter frame means in response to the action of a lifter arm assembly and camming means.

BRIEF DESCRIPTION OF THE DRAWINGS

The apparatus which forms the inventive portions may be more easily understood if reference is made to the accompanying drawings in connection with the following description, in which:

FIG. 1 is a side view showing the apparatus according to the invention;

FIG. 2 is a top view of the apparatus partially showing features illustrated in FIG. 1 and also features not included in FIG. 1;

FIG. 3 shows a typical pan as it is held in position by the pan fingers;

FIG. 4 is a detail showing one type of pan finger suitable for use in the invention; and FIG. 5 illustrates an air line assembly arrangement which could be utilized to control the movement of the air cylinders illustrated in FIG. 2.

DESCRIPTION OF THE PREFERRED EMBODIMENT

Referring now to FIG. 1, some of the essential elements according to the invention are illustrated. The frame structure of the cream filling apparatus is generally shown in outline form by dotted line 10. The outline of the cream hopper and injection nozzles are shown by dotted lines 11 and 11' respectively. A soft cake bake pan 12 moves on conveyor belt 13 in the direction of arrow 14. The conveying belt 13 is mounted in a continuous loop on pulleys 15,16 which in turn are mounted by shafts 17,18. Either pulley 15 or 16 may be driven to provide continuous motion for the belt. In the example according to the invention, and as may be more easily understood in connection with the description of FIG. 2, shaft 18 is driven and supplies the power for the belt motion.

A belt support member 19 is provided under the belt to form a structural support for the pulley and pan. The support member 19 extends and attaches to a pulley frame extension 20 which is also mounted on shaft 17. The frame extension 20 is connected by a rod 21 to a vertical support member 23 which is fixed between a support shaft 22 and member 19. Support 23 mounts a roller 24 which provides the rolling support and tension for the belt 13. The roller 24 is mounted in slot 25 of member 23 to allow the tension of the belt to be adjusted. Another support shaft 26 is provided forward of support shaft 22, and another vertical support member 27 is connected between shaft 26 and belt support member 19.

The elements just described provide the motion through the machine for the pan 12, and consists of a belt mounted on a pair of pulleys, at least one of which is driven, the belt being supported by the rigid supporting member 19 which is fixed to the frame.

Since the hopper 11 and nozzles 11' are fixed with respect to the machine frame 10, the pan 12 must be lifted from the conveying belt level to the height of nozzles 11' to be in a filling position. The element required to accomplish the intermittent lifting of pan 12 will now be described.

A lifter frame 28 is positioned with one end pivotally mounted on shaft 18. A lifter arm assembly is provided comprising a lifter arm 29 and a cam follower 29a mounted in lifter arm 29. One end of lifter arm 29 is pivotally mounted on pivot point 30 in the machine frame. The other end of lifter arm 29 is swivel mounted at point 31 which, by means of a connecting link 31a, is swivel connected to point 31b in lifter frame 28. A driven cam 32 mounted in the frame causes the intermittent lifting of lifter frame 28. Cam follower 29a, following the contour of cam circumference 33 causes lifter arm 29 to pivot on point 30 and raise, by means of point 31 connecting link 31a and pivot point 31b, the lifter frame 28 and pan 12 to the filling position under nozzles 11'. In one embodiment, it was found that a satisfactory speed for the driven cam 32 is 28 RPM. The cam may be driven in a conventional manner by a separate driving motor or by any combination of speed belts. A standard practice is to use a common drive motor and linkage belts which drive the various cams and pulleys required for conveying the pan through the apparatus.

A stationary support rod 34 is mounted by means 34a in the frame 28 and serves as the support rod for the air cylinders more specifically shown in FIG. 2. A stationary pivot rod 35 is also mounted by means 35a in lifter frame 28 and serves as the pivot means for pan fingers more specifically shown in connection with FIGS. 2 and 3.

Referring now to FIG. 2, the sides 10,10' of the frame are illustrated in dashed lines. The pan 12 is shown in dashed lines and is positioned between lifter frame 28,28' representing the left and right sides respectively. The frame sides include a lifter frame support 36,36', and are responsive to respective driven cams 32,32'. For purposes of clarity, only the cams have been shown and not the lifter arm assembly which are responsive to the cams to cause the raising of the lifter frame 28,28' by respective lifter frame pivot points 31b,31b'. Also, the lifter frame 28,28' is pivotally mounted by means 37,37' to shaft 18. Shaft 18 is rotated by a drive gear 38. Drive gear 38, of course, may be coupled by couplings to a common drive motor which also drives the camming arrangement. Rotation of shaft 18 causes, by means of pulley arrangements 16,16', the movement of the belt 13,13' in the direction indicated by arrow 14.

The pulley frame extensions 20,20a support pulley 15 and extensions 20', 20a' support pulley 15'. Rollers 24,24' mounted in vertical support member 23 (shown only in FIG. 1), support the underside of the continuous belt loops 13,13'.

Support shaft 26 with vertical support member 27,27', is fixed to the frame sidewalls 10,10', and supports the forward belt support member 19 (shown in FIG. 1). Positioned in lifter frame 28,28' is stationary rod 34 and pivot rod 35.

As shown in FIG. 2, air cylinders 39,39' are fixed at one end to rod 34 by connecting means 40,40'. The piston extension/retraction rods 41,41' are connected to pivotable pan finger stops 42,42'. The finger stops are rotatably mounted on rod 35. Air intake and exhaust ports 43,43' control the extension/retraction of piston rods 41,41'. The first time the fingers are raised they stop the forward movement of the pan by engaging the forward edge 12a. The second time the fingers are raised they engage the inside rearward edge 12b as illustrated in connection with FIG. 3.

Referring now to FIG. 3, a portion of pan 12 is shown mounted on the belt 13 and support member 19, and engaged by pivotable finger stop 42. The finger stop 42 is rotatably mounted on rod 35. The finger stop 42 has an upper portion 42a which engages the inside rearward edge 12b of the pan. Referring additionally to FIG. 4, a typical finger stop is illustrated having an upper portion 42a which tapers out to a protruding portion 42b which is used to stop the pan the first time the fingers are raised. The center portion 42c is rotatably mounted on rod 35 in a standard manner. Angular extension 42d is attached through hole 42e to the piston rod 41 of air cylinder 39. The extension/retraction of piston rod 41, in response to selective air pressure coupled to ports 43, causes the pivoting of finger stop 42 in a rearward (non-engaging) or a forward (engaging) position. This motion retains pan 12 in the predetermined selected position. This position permits lifter frame support 36,36' to raise the pan to the height of the injection nozzles 11'.

Referring again to FIG. 2, there is illustrated a further feature of the invention comprising cylinder cam operating means to control the movement of the finger stops in synchronism with the rotation of the driven cams 32,32'. Cylinder operating cams 44,44' are mounted on a common shaft 45 with driven cam 32'. Valves 46,46' are activated by cams 44,44' to cause the first and second time raising of finger stops in time with driven cam 32'. A schematic of the air line assembly is shown in connection with FIG. 5. The valves 46, 46' are connected by hoses 47 through side frame 10' to a distributing means 48. The distributing means 48 connects hoses 49,49' to the ports 43,43'. One example of a valve suitable for valve 46 is a Modernair Valve type 5140–05, and a valve suitable for a 46' is an Imperial Valve type 394–C–14. These valves, in response to activation by cylinder operation cams 44,44', cause movement of piston rods 41,41' in the directions indicated by arrows 50.

The operation of the arrangement according to the preceding description and drawings may be summarized as follows. The pans 12 are placed on the two parallel conveying belts, even carelessly, and are moved in the direction of arrow 14 to two waiting pan finger stops 42,42'. The stops are in raised position by virtue of the action of two air cylinders 39,39', since activation of valve 46 by cam 44 causes extension of rods 41,41' and they stop and align the pans aided by the lifter frame sides 28,28'. The finger stops are lowered by activation of valve 46' by cam 44' causing retraction of rods 41,41', allowing the pan to move forward, and then the stops are raised in time to catch the inside edge as shown in FIG. 3 to stop the pan directly under the nozzles. The pan 12 is raised off the belts by the lifter frame and pan support to be filled by nozzles 11'. The pan is then lowered onto the belts, and during this time the finger stops again have been lowered because 46' has been activated to permit the continuing motion of the pan through the apparatus. The pan finger stops are again raised by activation of valve 46 after the pan has passed to stop the next pan to be filled, and the cycle is repeated. The timing of the finger stops and the raising of the pan is controlled by the driven cams 32,32' and the cylinder operating cams 44,44'. The complementary shaping of the cams to effect this operating procedure is well known in the art.

As indicated in the background of the invention, one of the improvements of this lifting deice over the prior art is the elimination of the massive table structure associated with the prior art. As should be understood from reading the preceding specification, the lifting portion of this arrangement comprises two side lifter frames 28,28', one end of which is pivotally mounted, and a pan support portion 36,36'. Air cylinders and fingers are also mounted on this lifting frame. Thereby, the mass to be moved by cams 32,32' is considerably reduced, and further reduction can be made by constructing the movable parts from aluminum.

Although I have described above features of the invention in connection with specific apparatus, it should be clearly understood that this description is made solely by way of example and not as a limitation on the scope of the invention as set forth in the objects and features thereof and in the accompanying claims.

I claim:

1. Apparatus for filling and conveying soft-baked goods contained in a pan comprising:
    a pair of moving parallel feed belts which move the pan to a predetermined position in the apparatus;
    lifting frame means pivotally mounted and positioned to lift the pan off the belts;
    a finger stop pivotally mounted on said frame means and selectively activated; and
    means operatively connected to said lifting means to cause the raising of the pan to a filling position.

2. The apparatus according to claim 1 wherein said finger stop is selectively activated by pneumatic means.

3. The apparatus according to claim 2 wherein said operatively connected means includes a lifter arm assembly and a driven cam cooperatively connected to cause intermittent raising of said pan.

4. A motion effecting apparatus for pans containing cake products to be filled comprising:
    two pan stops;
    parallel conveying belts which move the pans to said two pan stops;
    a lifting frame pivotally mounted to lift the pans off the conveying belts;
    said two pan stops are pivotally mounted on and movable with said lifting frame;
    a driven cam; and
    means under control of said driven cam to cause the lifting frame to pivot at one end and move the pans to a filling position.

5. The apparatus according to claim 4 wherein said lifting frame further including pneumatic means mounted to cause the movement of said pair of stops.

6. Motion effecting apparatus comprising:
    a feed belt formed in a continuous loop;
    means for lifting a pan from said belt including a pair of lifting frames and means for stopping said pan;
    arm assembly means coupled to said lifting means to cause the movement of said lifting means; and
    driven cam means to control the intermittent lifting of said pan, said driven cam means acting on said arm assembly means.

7. The apparatus according to claim 6 wherein said pair of lifting frames are pivotally mounted on one end in said apparatus.

8. The apparatus according to claim 7 wherein said means for stopping said pan include rotatably mounted pan fingers and pneumatic means positioned in said lifting frames and operative to cause said pan fingers to engage said pan.

9. The apparatus according to claim 8 wherein said arm assembly means includes a lifter arm pivotably mounted at one end, and a cam follower coupled to follow the camming surface of said driven cam means.

10. A conveying apparatus for pans containing cake products to be filled comprising:
  two pan stops;
  parallel conveying belts which move the pans to said two pan stops which are selectively activated;
  a lifting frame pivotally mounted to lift the pans to be filled off the conveying belt;
  a driven cam;
  means under control of said driven cam to cause the lifting frame to pivot at one end and move the pans to a filling position; and
  means mounted on the lifting frame to selectively activate said stops.

* * * * *